No. 873,422.

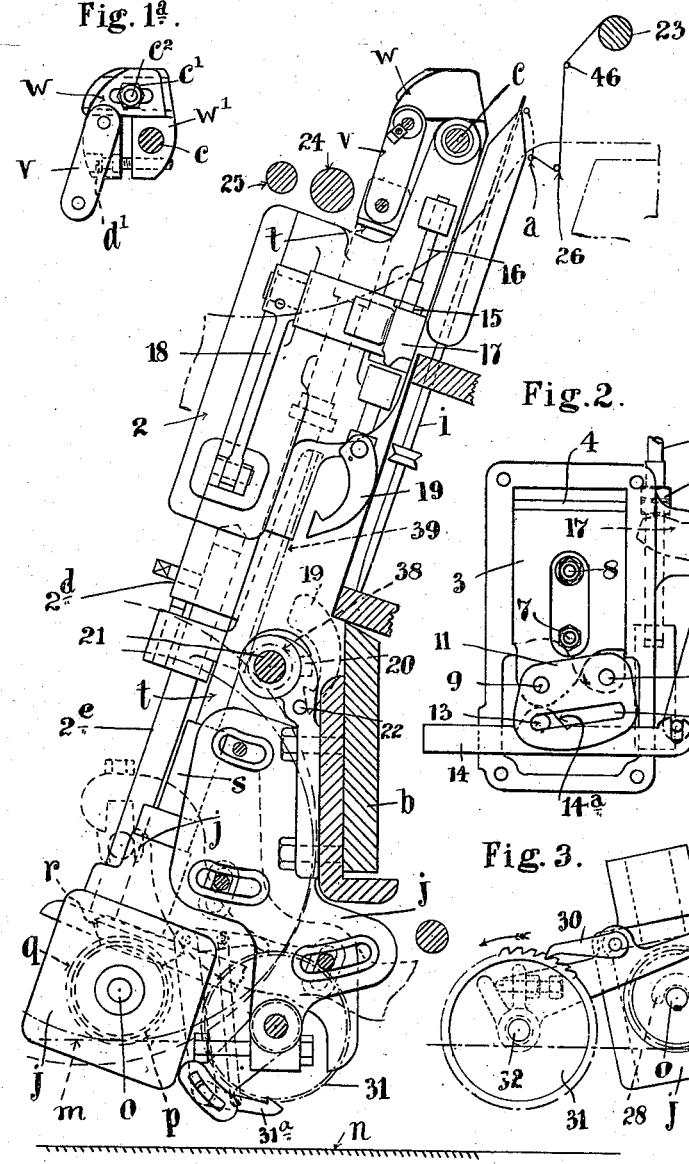

PATENTED DEC. 10, 1907.

H. S. GOLLAND.
SPINNING MULE.
APPLICATION FILED APR. 19, 1907.

7 SHEETS—SHEET 2.

WITNESSES

INVENTOR.
Henry Stafford Golland
By his Attorney

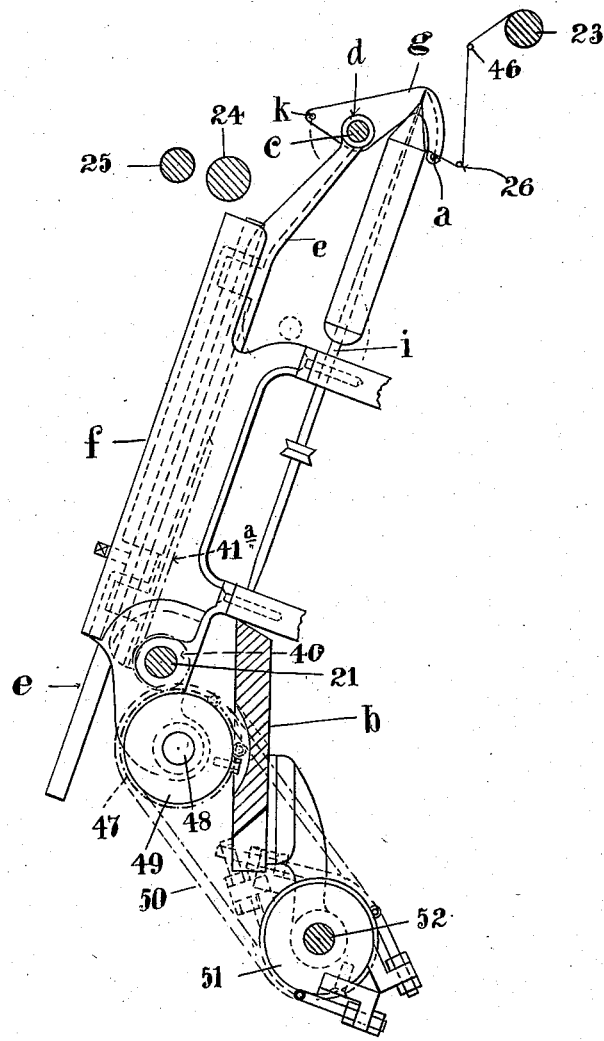

No. 873,422.
PATENTED DEC. 10, 1907.
H. S. GOLLAND.
SPINNING MULE.
APPLICATION FILED APR. 19, 1907.
7 SHEETS—SHEET 4.
Fig. 9.
Fig. 8.
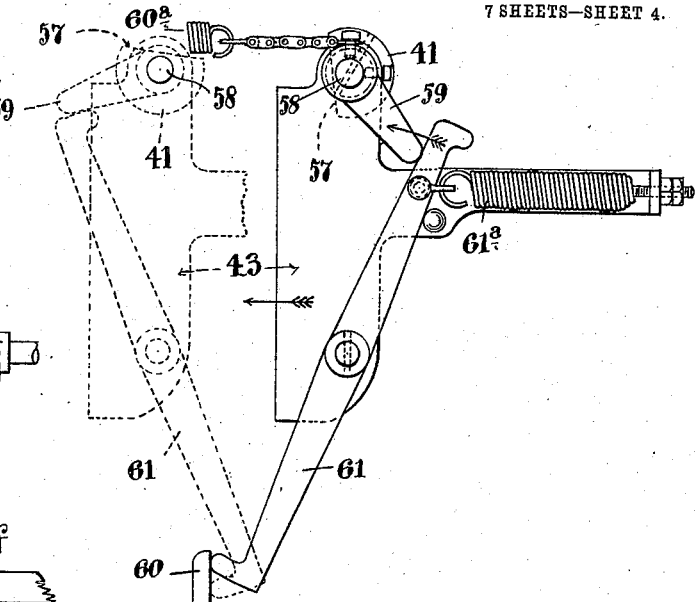
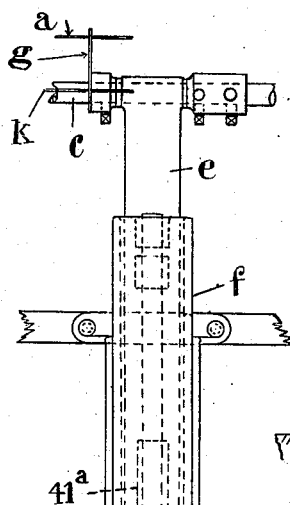
Fig. 10.
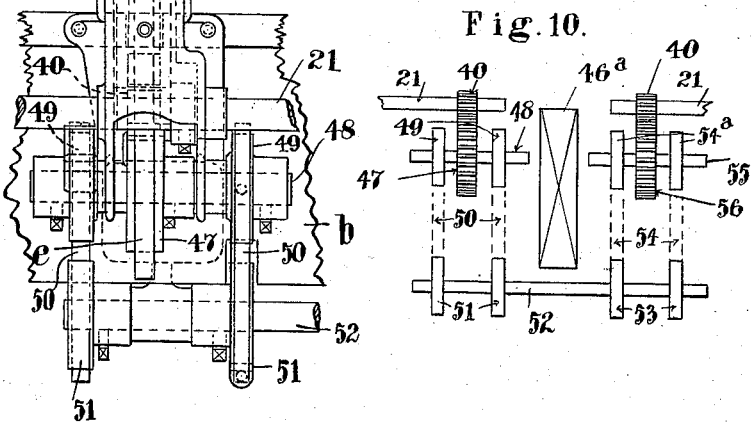
WITNESSES.
W. P. Burke
M. Petit
INVENTOR.
Henry Stafford Golland
By his Attorney Wm Wallace White No. 873,422.  
PATENTED DEC. 10, 1907.  
H. S. GOLLAND.  
SPINNING MULE.  
APPLICATION FILED APR. 19, 1907.

7 SHEETS—SHEET 5.

WITNESSES.

INVENTOR.  
Henry Stafford Golland

By his Attorney

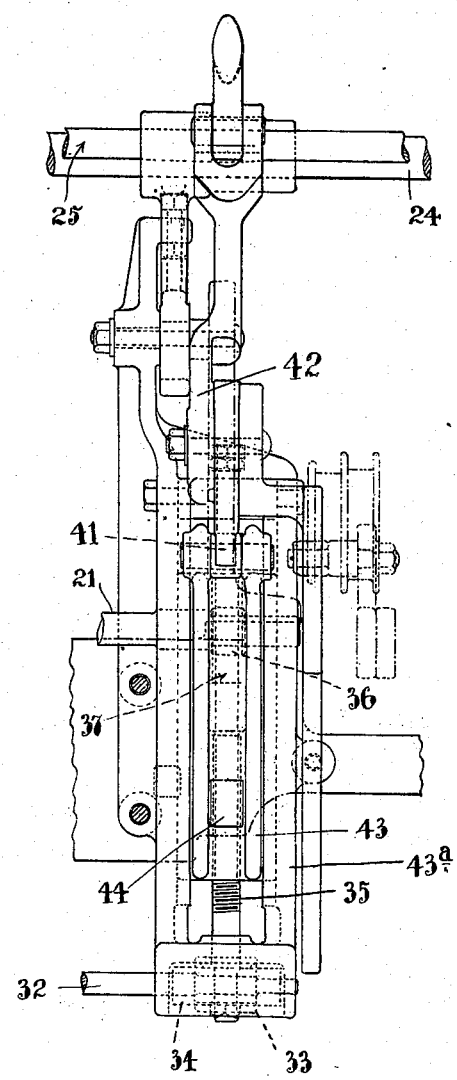

No. 873,422. PATENTED DEC. 10, 1907.
H. S. GOLLAND.
SPINNING MULE.
APPLICATION FILED APR. 19, 1907.
7 SHEETS—SHEET 7.
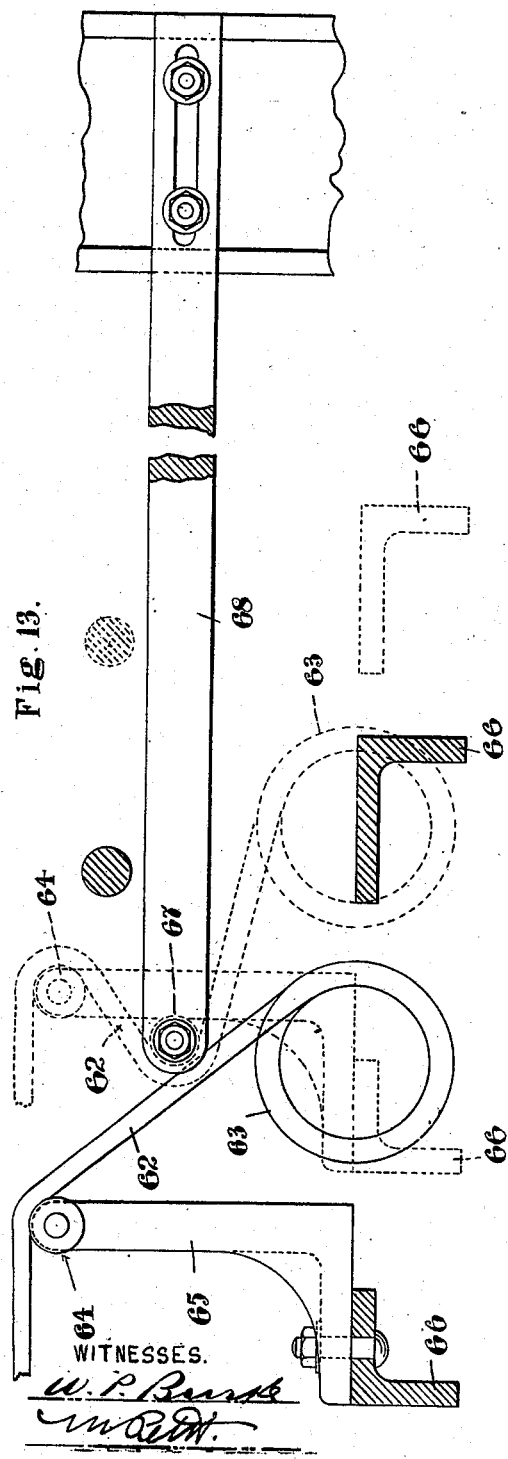
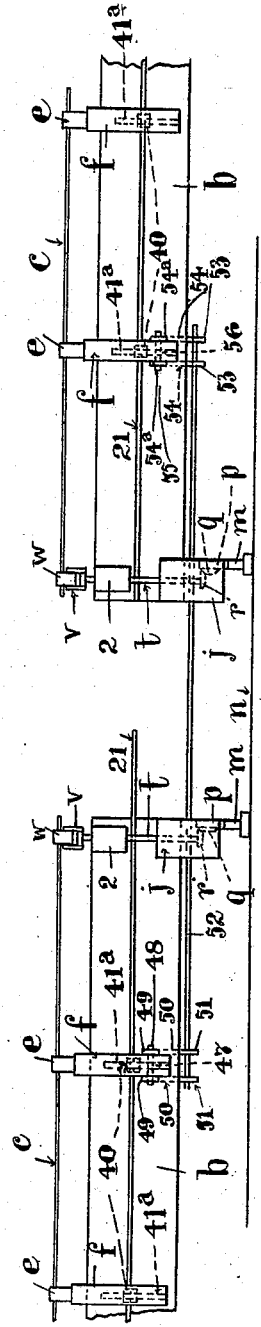
WITNESSES.
INVENTOR.
Henry Stafford Golland
By his Attorney

UNITED STATES PATENT OFFICE.

HENRY STAFFORD GOLLAND, OF MANCHESTER, ENGLAND.

SPINNING-MULE.

No. 873,422.  Specification of Letters Patent.  Patented Dec. 10, 1907.

Application filed April 19, 1907. Serial No. 369,101.

*To all whom it may concern:*

Be it known that I, HENRY STAFFORD GOLLAND, a subject of Great Britain, residing at 10 Park road, Eccles Old Road, Manchester, in the county of Lancaster, England, merchant, have invented new and useful Improvements in Spinning-Mules, of which the following is a specification.

My invention has reference to improvements on a prior invention for which I have obtained Letters Patent for the United States of America No. 750026.

The object of such prior invention was to enable cross wound cops to be produced in a spinning mule by vibrating the threads as the mule carriage ran in by means of a vertically oscillated guide rod or wire placed between the spindles and the winding faller wire.

My present invention, which I will describe with reference to the accompanying drawings, relates to improvements upon the invention disclosed in the specification of the said prior patent and to means whereby I am enabled to apply it to spinning mules with a minimum of trouble and alteration of the mule.

Figure 4:
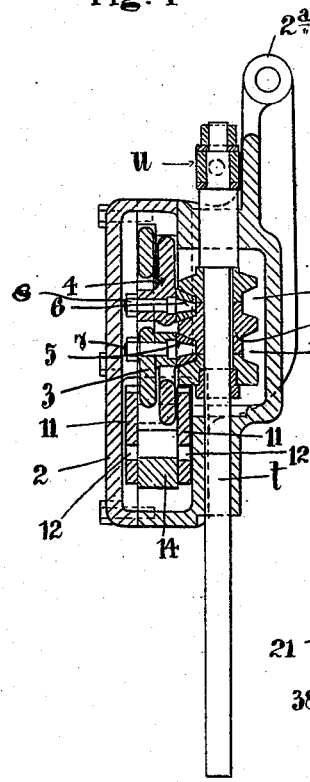
Figure 5:
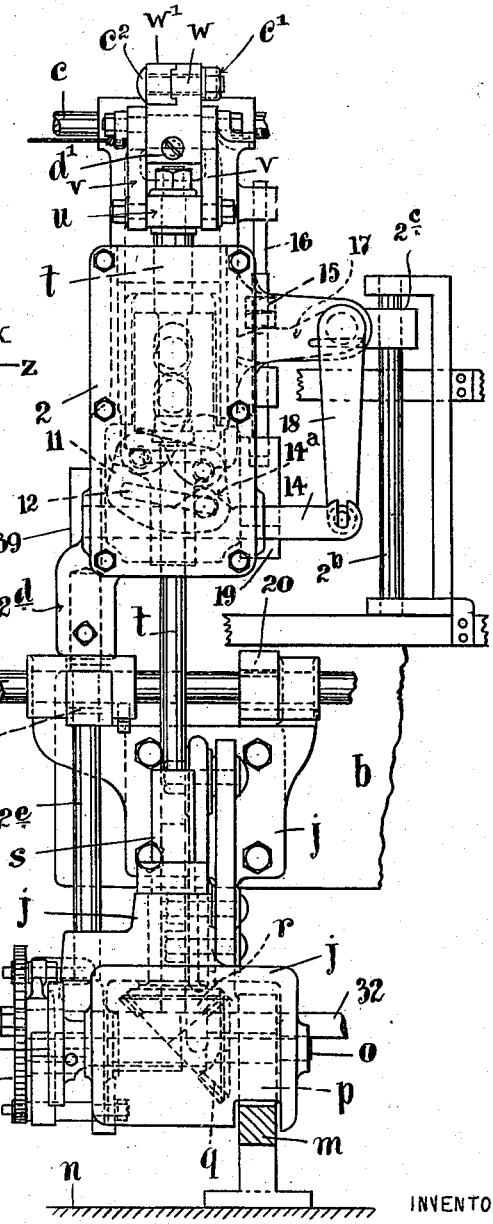
Figure 6:
Figure 11:
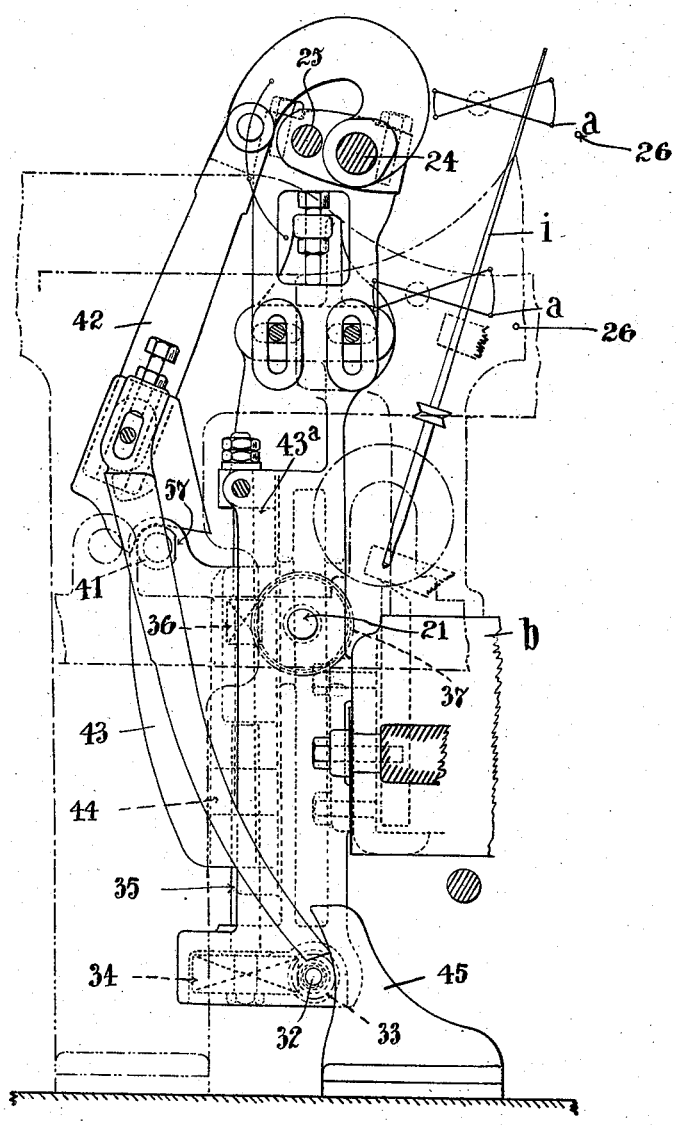

Figure 1 shows in side elevation part of my improved mechanism. Fig. 1$^a$ is a detail view. Fig. 2 is a face view of part of Fig. 1 with a cover plate removed. Fig. 3 is a part of Fig. 1. Fig. 4 is a sectional end elevation of a portion of Fig. 1. Fig. 5 is a front elevation of Fig. 1. Fig. 6 is a sectional plan of a detail part. Fig. 7 is a side elevation of one of the "pokers" used with my mechanism. Fig. 8 is a front elevation of Fig. 7. Fig. 9 is a detail part on a larger scale. Fig. 10 is a diagram. Fig. 11 is a side elevation of the winding faller locking lever and means for actuating same. Fig. 12 is a front elevation of Fig. 11. Fig. 13 is a detail view on an enlarged scale. Fig. 14 is a diagram showing the front elevation of the mule carriage and my invention applied thereto.

To impart to the guide wire $a$ the necessary oscillatory movement, shown in dotted lines in Figs. 1 and 7, I provide the mule carriage $b$ at each side of the headstock, with a rock shaft or rod $c$ rotatably mounted in bearings $d$, provided by "pokers" $e$ which are slidable in brackets $f$ secured to the front of the mule carriage. This arrangement of the rock shaft $c$ and the pokers carrying the same will be seen in the diagram Fig. 14.

At intervals along the length of these rock shafts $c$ are carried bent fingers or parts $g$ (see Figs. 7 and 8) through which, at one end of the fingers $g$, pass the guide wires $a$, which wires are disposed in the space between the spindles $i$ and winding faller wire 26 when the latter is lowered.

Means are provided to maintain the guide wire $a$ taut and to compensate for the strain which this imparts to the rock shaft $c$ actuating the guide wire, another taut wire $k$ is carried by the fingers $g$ at the other side of the rock shaft. To rock the shaft $c$ carrying the guide wire $a$, at each side of the mule headstock I provide a rack $m$ fixed on the floor $n$ of the room, and secure a bracket $j$ to the front of the mule carriage $b$ at the end near the head stock (see Figs. 1, 5, and 14) which bracket provides bearings for a shaft $o$ carrying a pinion $p$ meshing with the rack $m$. The pinion $p$, or its shaft $o$, carries a bevel wheel $q$ gearing with a bevel wheel $r$ secured on a sleeve $s$ rotatable in bearings in the bracket $j$. This bracket $j$ is of such a construction as will incase the pinion $p$ and bevel wheels $q$ $r$. The sleeve $s$ is inclined to the vertical, corresponding to the angle of the spindles $i$, and slidable within the sleeve $s$, but rotatable therewith by means of a slip feather and groove as shown in the sectional plan Fig. 6, is a shaft $t$ the upper end of which is loosely socketed in a crosshead $u$ (Figs. 4 and 5). This crosshead $u$ is loosely connected to links $v$ which are secured also to a crank $w$ on the rock shaft $c$. The crank $w$ is adjustably connected to the rock shaft $c$ to vary, when desired, the amount of rotary movement of the rock shaft, and thereby the traverse of the guide wire $a$. The method of adjusting the crank will be more clearly seen from the detached view Fig. 1$^a$. The crank is in two portions the part $w$ of which is attached to the links $v$, and a part $w'$ secured to the rock shaft $c$. By slackening the nut $c^1$ of the connecting bolt $c^2$ and rotating the screw $d'$ the part $w$ can be moved towards, or away from, the part $w'$ so as to increase or diminish the leverage of the crank as desired. To enable the shaft $c$ to be rocked through the medium of the crank $w$, links $v$ and connecting shaft $t$, the shaft $t$ is reciprocated within the sleeve $s$ in addition to receiving rotary movement from the sleeve $s$ in which it is socketed. This reciprocatory movement should be the shortest when first commencing to wind upon the bare spindle so that the throw of the yarn guide $a$ will also be short, in order to form a thick or blunt cop bottom. The throw or traverse of the yarn guide $a$ should be automatically and gradually increased during the formation of the cop bottom, the maximum traverse of the yarn guide $a$ being attained when the cop bottom is completed. After the cop bottom has been formed the maximum traverse of the yarn guide is maintained throughout the entire building of the cops. To effect this the shaft $t$ carries a boss $z$ cut with two cam grooves $x$ $y$. Inclosed within a casing 2 which forms a bearing for the shaft $t$, are two plates 3 and 4 slidable within the casing. A front view of the casing 2 with the cover removed is shown in Fig. 2, and Fig. 4 shows the same in end section. The plates 3, 4 are each provided with a bowl 5, 6 rotatable on studs 7 8 secured to the plates 3 and 4. The cam groove $y$ is of a less pitch than the cam groove $x$. If therefore the plate 3 carrying the bowl 5 is held fixed while the plate 4 is allowed to rise and fall freely in the casing 2 the shaft $t$, when rotated as already described, will also be reciprocated within the sleeve $s$ to its minimum extent, owing to the influence of the bowl 5 on the cam $y$. If the fixed plate 3 be gradually released so as to allow it to rise and fall within the casing 2 to an increasing extent, and also at the same time the loose plate 4 be gradually locked within the casing to prevent its rising and falling, the effect of the bowl 5 upon the cam $y$ will be diminished while the effect of the bowl 6 will be correspondingly increased. As the bowl 6 engages with the cam $x$ having the larger throw or pitch, the result is that the shaft $t$ is gradually reciprocated to an increased extent until the cop bottom is finished when the plate 3 is entirely released. The plate 4 is at that time locked, so that the bowl 6, being immovable or practically so, its influence upon the cam $x$ of the greatest pitch, causes the shaft $t$ to receive its greatest reciprocatory movement within the sleeve $s$ and thus vibrate the yarn guide $a$ through an arc of a circle, as shown in dotted lines in Figs. 1 and 7, to its maximum extent.

To effect the locking and releasing of the plates 3 and 4 they are each loosely pivoted by pins 9 10 to side plates 11 11 which are provided with slots 12 (see Figs. 2, 4 and 5). Within the slots 12 are disposed pins 13 carried by a boss 14$^a$ on a bar 14 which is slidable in a straight line within the casing 2. In the position shown in Fig. 2 the pins 13 come below the pins 9 which loosely pivot the plate 3 to the side plates 11 and the plate 3 is thereby locked or held stationary. The plate 4 is free, or capable of oscillating within the casing 2, but if the bar 14 be moved to the right to bring the pins 13 immediately below the pins 10 which pivot the plate 4 to the side plates 11, the plate 3 is thereby gradually released and the plate 4 gradually locked. This movement of the bar 14 to bring the pins 13, from one end of the slots 12 to the other is effected by means of nuts 15 upon a rod 16, the nuts being in contact with the cranked end 17 of a lever 18 which is connected to the bar 14. It will be seen that if the rod 16 be pulled down the bar 14 and lever 18 will be shifted from the position shown in Fig. 2 to that of Fig. 5.

As more clearly shown in Fig. 1 the rod 16 carries a pivoted latch 19 which, when commencing to wind the cops, is about in the position shown in dotted lines in Fig. 1. A tooth 20 slowly rotated with the shaft 21 comes in contact with the latch 19 and thereby pulls down the rod 16, gradually shifting the lever 18 and bar 14 from the position shown in Fig. 2 until the cop bottom has been formed when the lever 18 and bar 14 have been moved into the position shown in Fig. 5. The method of slowly rotating the shaft 21 will be described hereafter. A fixed stud 22 in contact with the end of the latch 19 gradually moves the latch away from the tooth 20 so that when the cop bottom has been formed the latch can be lifted with the casing 2 in manner to be described. The method of shifting the bar 14 may be varied.

During the run out of the mule carriage in the operation of spinning the yarn is delivered by the rollers in the usual manner, the bottom of the front pair of rollers being shown at 23 in Figs. 1 and 7. The threads are then directed from the extreme tip of the spindles $i$, as is well known, and in this position the threads are out of reach of the guide wire $a$ which, although vibrating, cannot touch the threads and is thus inoperative. The winding faller shaft is marked 24 and the counter faller shaft 25. When the mule carriage runs in to wind the threads on the spindles the winding faller wire 26 is depressed by the usual mechanism of the mule to direct the thread to the base of the cop nose as shown in Figs. 1 and 7 and the oscillating guide wire $a$ raises and lowers the thread from the base to the apex of the cop nose several times during the run in of the carriage so that the thread is cross wound upon the spindles as will be understood. During this process of winding, the winding faller wire 26 is not slowly raised from the base of the cop nose to the apex as in the ordinary process of winding in spinning mules, but is held practically stationary, as it receives only such a very slight upward movement as is necessary to build the cops as will be now explained.

To obtain the building of the cops, a copping motion is provided which will synchronously raise the guide wire $a$, and the winding faller wire 26 to the required slight degree each time the mule carriage runs in. For this purpose mechanism is used, part of which is shown more clearly in Fig. 3. This figure is a view taken from the opposite side of the lower part of Fig. 1. The shaft $o$ carrying the pinion $p$ which meshes with the rack $m$ on the floor, carries a disk 27 having a pivoted pawl 28 which is inoperative on the run out of the carriage as shown in dotted lines, but when the carriage runs in, and the threads are being wound on the spindles, the pawl 28 comes into contact with and actuates a lever 29 carrying a pawl 30 which intermittently rotates a ratchet wheel 31 fixed on a shaft 32. The ratchet wheel 31 is locked by a detent $31^a$ Fig. 1.

The shaft 32 is carried in suitable bearings and is shown in Figs. 11 and 12. The motion of the shaft 32 is communicated by a worm 33 to a worm wheel 34 fixed on a vertical screwed shaft 35 mounted in suitable bearings. On the shaft 35 is fixed a worm 36 gearing with a worm wheel 37 on the shaft 21 already referred to. The shaft 21, thus slowly rotated, is provided with a pinion 38 which gears with a rack 39 secured to the casing 2 (see Fig. 1) so as to gradually raise the casing 2 and the shaft $t$ therewith as the cops are being formed. The casing 2 has a bearing $2^a$ (Fig. 4) for the rock shaft $c$, and is guided by brackets $2^c$ $2^d$ one of which brackets $2^c$ is slidable on a fixed guide rod $2^b$. The other bracket $2^d$ is attached to a rod $2^e$ which is guided in the bracket $j$. The shaft 21 is also provided with pinions 40 gearing with racks $41^a$ secured to the pokers $e$ which also carry the rock shaft (see Fig. 7) so that as the carriage runs in, the guide wire $a$, in addition to being oscillated through the arc of a circle as described, is also raised a slight degree necessary to build the cops by the lifting of the pokers $e$ and the casing 2 which also acts as a poker. As explained the winding faller wire 26 when actuated by the usual means to direct the yarn to the base of the cop nose is held practically stationary during the run in of the carriage. The usual copping rail is therefore dispensed with and the bowl 41 which supports the winding faller lever 42 (shown in Figs. 11 and 12) during the run in of the mule carriage is carried by a bracket 43 slidable in a suitable guide $43^a$. The bracket 43 is recessed to receive a nut 44 upon the screwed shaft 35. The locking lever 42 is lifted on the bowl 41 by the usual mechanism of the mule when the winding of the threads upon the spindles is to be commenced. To effect the gradual lift of the winding faller wires on the run in of the mule carriage synchronously with the guide wires $a$ to build the cops, the ratchet wheel shaft 32 communicates motion as described to the screwed shaft 35 which being thus slightly rotated during the run in of the carriage actuates the nut 44 lowering the bracket 43 and attached bowl 41 on which the locking lever 42 rests so that the winding faller wires 26 are slightly raised as the carriage runs in and the necessary variation of the position of the bowl 41 is secured. When the mule carriage has reached the end of its inward run the faller locking lever 42 is knocked off the bowl 41 by means of the usual stop 45 on the floor as shown in Fig. 11. The counter faller wires 46 are not interfered with under my invention but are actuated in the usual way.

The mechanism described for oscillating the guide wires $a$ is repeated at each side of the headstock. I may similarly repeat the mechanism for gradually raising the guide wires $a$ to build the cops, but for the sake of simplicity and economy I prefer to raise the pokers $e$ and the casing 2 carrying the rock shaft $c$ of the guide wire $a$ at each side of the headstock by means shown in Figs. 7 and 8 and in the diagrams Figs. 10 and 14 as follows.

The shaft 21 at the left hand side of the headstock (see diagram Fig. 14) is slowly rotated by the means described. The motion of this shaft 21 is transmitted to the corresponding shaft 21 at the right hand of the headstock as follows, the headstock being indicated at $46^a$ Fig. 10.

Referring to Figs. 7, 8 and 10 it will be seen that the pinion 40 which gears with the rack $41^a$, on the poker $e$ also gears with a pinion 47 on a countershaft 48. The motion of this countershaft 48 is communicated by pulleys 49 and chains 50 to pulleys 51 on a shaft 52. The shaft 52 in turn transmits its motion by pulleys 53 and chains 54 to pulleys $54^a$ and to a countershaft 55 which countershaft carries a pinion 56 gearing with the pinion 40 which gears with the rack $41^a$ on the poker $e$. The chains 50 and 54 are in duplicate and are so wound on the pulleys 49 51 53 and $54^a$ that when the shaft 21 to the left of the headstock is driven in the manner described during the building of the cops, one set of chains is unwound from the pulleys on the shaft 52 and wound on the pulleys of the countershafts 48 55, the pull on these chains causing the rotation of the shaft. At the same time the other set of chains is wound on the pulleys on the shaft 52 and unwound from the pulleys on the countershafts 48 and 55.

When a set of cops has been completed all the parts can be returned to their initial starting points to commence winding cops by rotating in a reverse direction the ratchet wheel shaft 32 by means of a suitable handle.

Just at the completion of winding a "stretch" of yarn upon the spindles when "delivering", and the winding faller wires 26 are lifted, there is a certain length of slack yarn present which to take up properly upon the spindles, I find it is necessary to arrest momentarily the upward movement of the winding faller wire 26 when it is opposite to the apex of the cop nose. Also during this movement of the winding faller wire from the base to the apex of the cop nose, and when thus arrested, the speed of the spindles must be greatly accelerated.

The means to effect the momentary pause of the winding faller wire 26 when opposite the apex of the cop nose are shown separately and on an enlarged scale in Fig. 9. The bowl 41 upon which the faller locking lever rests during the run in of the carriage is formed with a flattened part or reduced diameter 57. When the carriage is running in, in the direction marked by the arrow, at first the locking lever rests upon the larger diameter of the bowl. The bowl is provided with a shaft or spindle 58 having a crank or finger 59 thereon. When the carriage has almost attained the end of its inward run a stop 60 on the floor comes into contact with a pivoted lever 61 carried on the bracket 43 which lever is turned on its fulcrum against the finger 59 causing the spindle 58 to be slightly rotated so as to rotate the bowl 41 and allow the locking lever to drop from the larger to the smaller diameter or flattened portion 57 of the bowl. The movement of the faller locking lever caused by the partial rotation of the bowl raises the winding faller wires 26 from the base of the cop nose to the apex, and they are caused to dwell at this point momentarily until the usual stop 45 on the floor knocks the locking lever off the bowl entirely in the ordinary way (see Fig. 11) when the winding faller wires 26 complete their upward movement. Springs 60$^a$, 61$^a$ are employed to return the pivoted lever 61, shaft 58 and bowl 41 to their normal positions when the locking lever is knocked off the bowl. To accelerate the speed of the spindles during the period of time when the winding faller wires 26 are being raised from the base of the cop nose to the apex and during their pause at this point as described, the chain 62 leading from the quadrant arm to the chain winding drum 63 is passed over a guide bar 64 carried by a bracket 65 attached to the carriage square 66, the bracket being placed above and near to the drum as shown in Fig. 13. When the carriage nearly reaches the end of the inward run a fixed stop or bar 67 carried by a bracket 68 secured to the headstock side comes into contact with the short length of chain 62 passing over the guide bar 64 to the winding drum 63, as shown in dotted lines and thus a strong and sudden force is exerted upon the chain 62 causing accelerated rotation of the winding drum 63 and the spindles to take up the slack yarn.

I declare that what I claim is.

1. In a spinning mule, a guide wire, a rock shaft actuating the guide wire, a crank on the rock shaft, links connecting the crank to a crosshead, a rod rotatably connected to the crosshead and means for rotating and reciprocating such rod to rock the shaft, substantially as described.

2. In a spinning mule, a guide wire, a rock shaft actuating the guide wire, a crank on the rock shaft, links connecting the crank to a crosshead, a rod rotatably connected to the crosshead, means for rotating and reciprocating such rod to rock the shaft, and means for gradually raising the rock shaft, substantially as described.

3. In a spinning mule, a winding faller wire, a guide wire, a rock shaft actuating the guide wire, a crank on the rock shaft, links connecting the crank to a crosshead, a rod rotatably connected to the crosshead, means for rotating and reciprocating such rod to rock the shaft, means for gradually raising the rock shaft, and the winding faller wire during the run in of the mule carriage to build the cops substantially as described.

4. In combination in a spinning mule a mule carriage, a rock shaft, fingers carried on such shaft, wires attached to the fingers at each side of the rock shaft one of such wires acting as a guide wire, a crank on the rock shaft, a cross head, a sleeve, links connecting the crank to the crosshead, a rod rotatably connected to the crosshead and slidably socketed in the sleeve, a shaft, a bevel pinion thereon, a bevel pinion on the sleeve meshing with the bevel pinion on the shaft, bearings for the shaft and sleeve provided by a bracket bolted to the mule carriage, a pinion on such shaft, a rack on the floor gearing with such pinion, cam grooves on the rod inclosed within a casing, a bearing carried by the casing for the rock shaft, two plates contained within the casing, bowls on such plates engaging with the cam grooves, means for locking and releasing the plates, pokers carrying the rock shaft, bearings for such pokers secured to the mule carriage, racks attached to the pokers and to the casing carrying the reciprocating rod, a shaft, means for slowly rotating such shaft each time the mule carriage runs in, pinions on such shaft gearing with the racks on the pokers substantially as described.

5. In combination with the rod $t$, a boss, two cam grooves of different pitches formed on such boss, a casing, two plates slidable within such casing, bowls on the plates engaging with the cam grooves, side plates pivoted to the slidable plates, each of said plates having a slot therein, a bar slidable in the casing, pins on such bar engaging with the slots and means for sliding the bar on the run in of the mule carriage substantially as described.

6. In combination in a spinning mule the mule carriage, the rack $m$, a shaft, a pinion on the shaft gearing with the rack, a disk on the shaft, a pawl on such disk, a lever oscillated by the pawl on the run in of the mule carriage, a pawl on such lever, a shaft, a ratchet wheel on such shaft intermittently rotated by the pawl, a worm on the intermittently rotated shaft, a screwed shaft, a worm wheel on the screwed shaft meshing with said worm, the shaft 21 and a worm wheel on such shaft meshing with a worm on the screwed shaft, the winding faller locking lever, a bowl on which such locking lever is brought to rest, a bracket carrying such bowl, bearings for such bracket a nut carried by the bracket mounted on the screwed shaft substantially as described.

7. In combination in a spinning mule the mule carriage the shafts 21 carried by the mule carriages at each side of the headstock, means for synchronously and slowly rotating such shafts at each run in of the mule carriage and cop building mechanism operated by the said shafts substantially as described.

8. In combination in a spinning mule, the mule carriage the winding faller locking lever, a bowl on which such lever rests on the run in of the mule carriage, a flat formed on such bowl, means for partially rotating the bowl to allow the locking lever to fall on the flat of the bowl substantially as described.

9. In combination in a spinning mule, the mule carriage, the spindles the winding faller locking lever, a bowl on which such lever rests on the run in of the mule carriage, a flat formed on such bowl, means for partially rotating the bowl to allow the locking lever to fall on the flat of the bowl, and means for synchronously accelerating the speed of the spindles substantially as described.

In testimony whereof I have signed my name to this specification in the presence of two subscribing witnesses.

HENRY STAFFORD GOLLAND.

Witnesses:
JOSHUA ENTWISLE,
ALFRED YATES.